(12) United States Patent
Seo

(10) Patent No.: US 7,727,103 B2
(45) Date of Patent: Jun. 1, 2010

(54) 8-SPEED AUTOMATIC TRANSMISSION FOR VEHICLE

(75) Inventor: Kangsoo Seo, Suwon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 356 days.

(21) Appl. No.: 11/950,067

(22) Filed: Dec. 4, 2007

(65) Prior Publication Data

US 2009/0069143 A1 Mar. 12, 2009

(30) Foreign Application Priority Data

Sep. 6, 2007 (KR) .................. 10-2007-0090665

(51) Int. Cl.
*F16H 3/62* (2006.01)
(52) U.S. Cl. .................................... 475/275
(58) Field of Classification Search .............. None
See application file for complete search history.

(56) References Cited

U.S. PATENT DOCUMENTS 7,618,342 B2* 11/2009 Kim ......................... 475/287
2008/0280721 A1* 11/2008 Seo ........................... 475/276
2009/0048062 A1* 2/2009 Seo et al. .................. 475/276

* cited by examiner

*Primary Examiner*—Dirk Wright
(74) *Attorney, Agent, or Firm*—Morgan, Lewis & Bockius LLP

(57) ABSTRACT

An eight-speed automatic transmission for a vehicle may include a single pinion planetary gear set, a double pinion planetary gear set, a compound planetary gear set, a first clutch, a second clutch, a third clutch, a fourth clutch, a first brake, a second brake, and a one-way clutch. The first and third clutches are disposed in series or in parallel between the compound planetary gear set and the output shaft. A first clutch piston chamber for operating the first clutch is disposed between the third clutch internal diameter and the input shaft. A third clutch piston chamber for operating the third clutch is disposed between the first clutch piston chamber and the output shaft. The second and fourth clutches are disposed between the compound planetary gear set and the double pinion planetary gear set. Thus, the overall volume of the automatic transmission may be reduced.

6 Claims, 5 Drawing Sheets

FIG.3

|  | C1 | C2 | C3 | C4 | B1 | B2 | OWC |
|---|---|---|---|---|---|---|---|
| 1ST | ● |  |  |  | ○ |  | ● |
| 2ND | ● |  |  |  |  | ● |  |
| 3RD | ● |  |  | ● |  |  |  |
| 4TH | ● |  | ● |  |  |  |  |
| 5TH |  |  | ● | ● |  |  |  |
| 6TH |  | ● | ● |  |  |  |  |
| 7TH |  |  | ● |  |  | ● |  |
| 8TH |  |  | ● |  | ● |  |  |
| R |  |  |  | ● | ● |  |  |

8-SPEED AUTOMATIC TRANSMISSION FOR VEHICLE

CROSS-REFERENCE TO RELATED APPLICATION

This application claims priority to and the benefit of Korean Patent Application No. 10-2007-0090665, filed in the Korean Intellectual Property Office on Sep. 6, 2007, the entire contents of which are incorporated herein by reference.

BACKGROUND OF THE INVENTION (a) Field of the Invention

The present invention relates to an eight-speed automatic transmission. More particularly, the present invention relates to an eight-speed automatic transmission that combines a plurality of planetary gear sets, and a first clutch and a third clutch thereof are disposed between a compound planetary gear set and an output shaft so that a lubrication structure thereof can be simplified.

(b) Description of the Related Art

A typical shift mechanism of an automatic transmission utilizes a combination of a plurality of planetary gear sets. A powertrain of such an automatic transmission changes rotating speed and torque received from a torque converter of the automatic transmission and transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is under constant investigation.

In addition, with the same number of speeds, features of a powertrain such as durability, efficiency in power transmission, and size depend a lot on the layout of combined planetary gear sets. Therefore, designs for a combining structure of a powertrain are also under constant investigation.

A manual transmission that has too many shift-speeds causes inconvenience of excessively frequent shifting operations to a driver. Therefore, the positive features of more shift speeds are more important for automatic transmissions because an automatic transmission automatically controls shifting operations basically without needing manual operation.

In addition to various developments regarding four and five speed powertrains, an eight speed automatic transmission has recently been developed.

In the eight-speed automatic transmission, an arrangement of friction elements, such as brakes and clutches, may influence design of a lubrication structure and may determine the total size and weight of an automatic transmission.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an eight-speed automatic transmission that combines a plurality of planetary gear sets, and a first clutch and a third clutch thereof are disposed between a compound planetary gear set and an output shaft.

The first clutch and the third clutch are disposed between a compound planetary gear set and an output shaft, so that design of a lubrication structure may be simplified and the diameter of friction elements may be reduced.

An eight-speed automatic transmission for a vehicle according to an exemplary embodiment of the present invention may include a single pinion planetary gear set, a double pinion planetary gear set, a compound planetary gear set, a first clutch, a second clutch, a third clutch, a fourth clutch, a first brake, a second brake, and a one-way clutch, wherein an input shaft is disposed for receiving power of an engine. The single pinion planetary gear set includes a first ring gear fixedly connected to an input shaft, a first sun gear fixedly connected to a housing, and a first planet carrier; the double pinion planetary gear set includes a second ring gear variably fixed to the housing by the first brake or the one-way clutch that are disposed in parallel, a second sun gear fixedly connected to the first planet carrier, and a second planet carrier variably connected to the second ring gear by the second clutch; and the compound planetary gear set includes a short sun gear variably connected to the second sun gear by the first clutch, a short pinion engaged with the short sun gear, a long sun gear fixedly connected to the second planet carrier, a long pinion engaged with the short pinion and the long sun gear and variably connected to the input shaft by the third clutch, and a third ring gear that is engaged with the long pinion, variably connected to the second planet carrier and the long sun gear by the fourth clutch, and connected to an output shaft. The second brake variably fixes the second planet carrier and the long sun gear to the housing; the single pinion planetary gear set, the double pinion planetary gear set, and the compound planetary gear set are disposed in a sequence of the single pinion planetary gear set, the double pinion planetary gear set, and the compound planetary gear set from the engine; and the first clutch and the third clutch are disposed between the compound planetary gear set and the output shaft.

A first clutch piston chamber for operating the first clutch may be disposed between the input shaft and a third clutch internal diameter.

A third clutch piston chamber for operating the third clutch may be disposed between the first clutch piston chamber and the output shaft.

The second clutch and the fourth clutch may be disposed between the compound planetary gear set and the double pinion planetary gear set.

As described above, according to an exemplary embodiment of the present invention, the first clutch and the third clutch are disposed between a compound planetary gear set and an output shaft, so that design of a lubrication structure may be simplified and the diameter of friction elements may be reduced.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 3 is an operational chart of the eight-speed automatic transmission for a vehicle according to the exemplary embodiment of the present invention.

DESCRIPTION OF REFERENCE NUMERALS INDICATING PRIMARY ELEMENTS IN THE DRAWINGS

Figure 1:
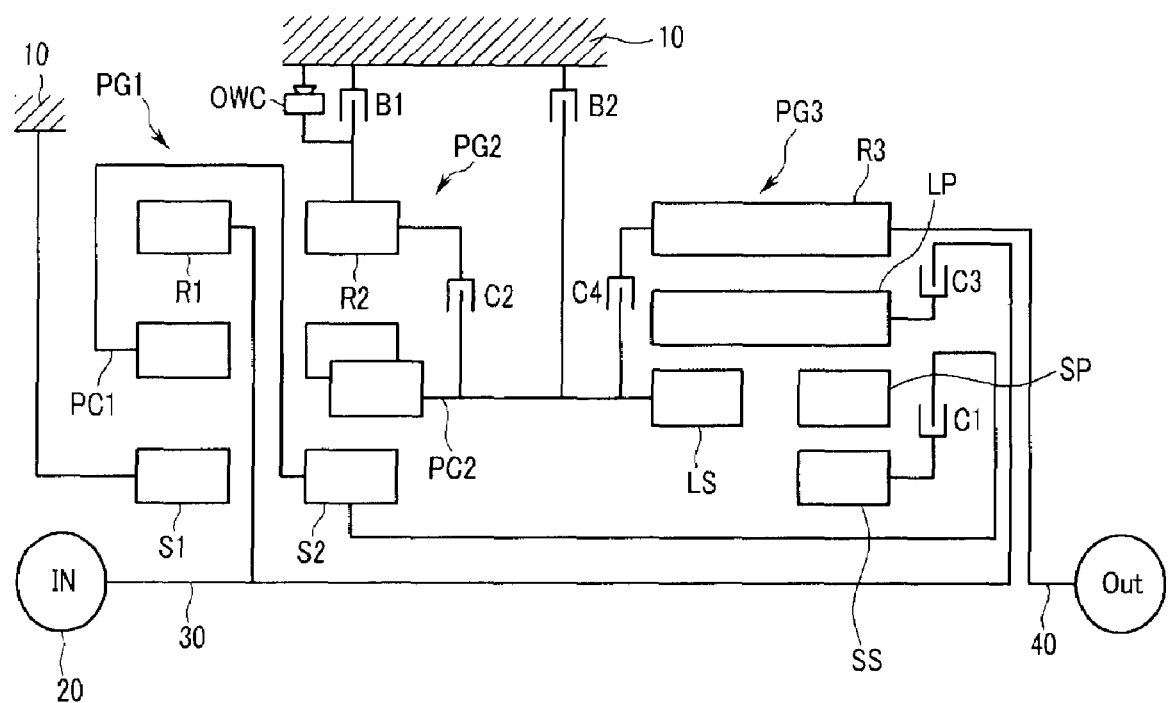
FIG. 1 is a schematic diagram of an eight-speed automatic transmission for a vehicle according to an exemplary embodiment of the present invention.

10: housing 20: engine
30: input shaft 40, 45: output shaft
50, 55: first clutch piston chamber 60, 65: third clutch piston chamber
70, 75: third clutch internal diameter
PG1: first planetary gear set PG2: second planetary gear set
PG3: third planetary gear set S1: first sun gear
R1: first ring gear PC1: first planet carrier
S2: second sun gear R2: second ring gear
PC2: second planet carrier SS: short sun gear
LS: long sun gear SP: short pinion
LP: long pinion PC3: third planet carrier
R3: third ring gear C1: first clutch
C2: second clutch C3: third clutch
C4: fourth clutch B1: first brake
B2: second brake OWC: one-way clutch It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

An exemplary embodiment the present invention will be described more fully hereinafter with reference to the accompanying drawings.

Reference numbers shown in FIG. 1 to FIG. 5 will indicate the same elements for ease of understanding.

FIG. 1 is a schematic diagram of an eight-speed automatic transmission for a vehicle according to a prior art.

An eight-speed automatic transmission for a vehicle of an exemplary embodiment of the present invention, as shown in FIG. 1, includes first, second, third, and fourth planetary gear sets PG1, PG2, PG3, and PG4, first, second, third, and fourth clutches C1, C2, C3, and C4, first and second brakes B1 and B2, and a one-way clutch OWC.

Power generated in an engine 20 is supplied through an input shaft 30.

The first, second, and third planetary gear set PG1, PG2, and PG3 are arranged in the sequential order of the first, the second, and the third planetary gear set PG1, PG2, and PG3 from the input shaft 30.

The first planetary gear set PG1 is formed as a single pinion planetary gear set including a first ring gear R1 fixedly connected the input shaft 30, a first sun gear S1 fixedly connected to a housing 10, and a first planet carrier PC1.

The second planetary gear set PG2 is formed as a double pinion planetary gear set including a second ring gear R2 variably fixed to the housing 10 by the first brake B1 or the one-way clutch OWC that are disposed in parallel, a second sun gear S2 fixedly connected to the first planet carrier PC1 of the first planetary gear set PG1, and a second planet carrier PC2 variably connected to the second ring gear R2 by operation of the second clutch C2.

The third planetary gear set PG3 that is formed as a compound planetary gear set includes a short sun gear SS variably connected to the second sun gear S2 by operation of the first clutch C1, a short pinion SP engaged with the short sun gear SS, a long sun gear LS fixedly connected to the second planet carrier PC2, a long pinion LP engaged with the short pinion SP and the long sun gear LS and variably connected to the input shaft 3 by operation of the third clutch C3, and a third ring gear R3 that is engaged with the long pinion LP, variably connected to the second planet carrier PC2 and the long sun LS by operation of the fourth clutch C4, and connected to an output shaft 40.

The second brake B2 may variably fix the second planet carrier PC2 and the long sun gear LS to the housing 10.

The second clutch C2 and the fourth clutch C4 are disposed between the second and third planetary gear sets PG2 and PG3.

Figure 2:
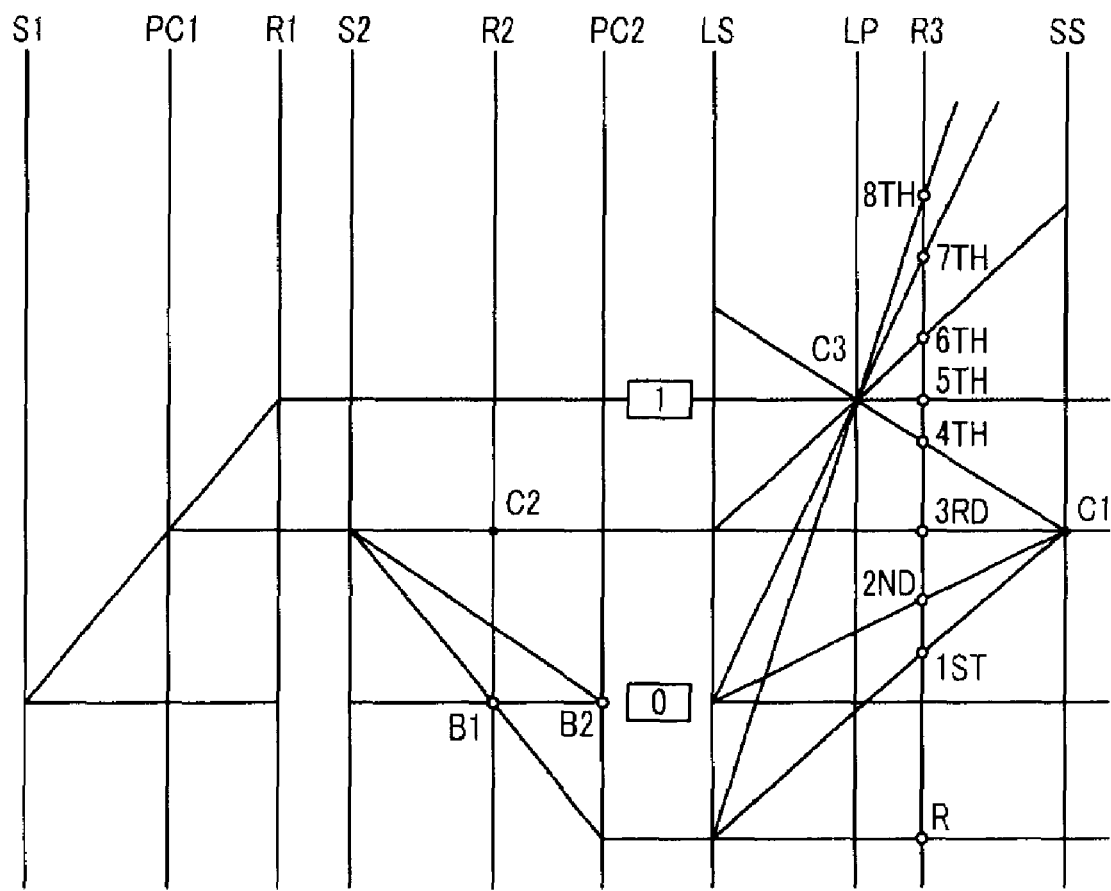
FIG. 2 is a speed diagram of an eight-speed automatic transmission for a vehicle according to the exemplary embodiment of the present invention.

A speed diagram and an operational chart of the eight-speed automatic transmission for a vehicle according to the exemplary embodiment of the present invention are shown in FIG. 2 and FIG. 3.

As shown in FIG. 3, the first clutch C1 and the first brake B1 or the first clutch C1 and the one-way clutch OWC are operated for the first forward speed, the first clutch C1 and the second brake B2 are operated for the second forward speed, the first clutch C1 and the fourth clutch C4 are operated for the third forward speed, the first clutch C1 and the third clutch C3 are operated for the fourth forward speed, the third clutch C3 and the fourth clutch C4 are operated for the fifth forward speed, the second clutch C2 and the third clutch C3 are operated for the sixth forward speed, the third clutch C3 and the second brake B2 are operated for the seventh forward speed, the third clutch C3 and the first brake B1 are operated for the eighth forward speed, and the fourth clutch C4 and the first brake B1 are operated for the reverse speed.

Hereinafter, referring to FIG. 2, a shifting operation of the eight-speed automatic transmission for a vehicle according to an embodiment of the present invention will be described in detail.

In FIG. 2, "0" in the horizontal portion line indicates that rotation speed is zero, and "1" means that rotation speed is equal to the rotation speed of the input shaft 3.

The first clutch C1 and the first brake B1 or the first clutch C1 and the one-way clutch OWC are operated for the first forward speed.

Then, the first ring gear R1 receives an input of an engine speed, and the first sun gear S1 and the second ring gear R2 act as fixed elements. In this case, according to a cooperative reaction of the first, second, and third planetary gear sets PG1, PG2, and PG3, the first speed line is formed and the output element of the third ring gear R3 rotates at a speed 1TH, and the shifting to the first forward speed is realized.

The first clutch C1 and the second brake B2 are operated for the second forward speed.

Then, the first ring gear R1 receives an input of an engine speed, and the first sun gear S1, the second planet carrier PC2, and the long sun gear LS act as fixed elements. In this case, according to a cooperative reaction of the first, second, and third planetary gear sets PG1, PG2, and PG3, the second speed line is formed and the output element of the third ring gear R3 rotates at a speed 2ND, and the shifting to the second forward speed is realized.

The first clutch C1 and the fourth clutch C4 are operated for the third forward speed.

Then, the first ring gear R1 receives an input rotation of an engine, and the first sun gear S1 acts as a fixed element. In this case, according to a cooperative reaction of the first, second, and third planetary gear sets PG1, PG2, and PG3, the third speed line is formed and the output element of the third ring gear R3 rotates at a speed 3RD, and the shifting to the third forward speed is realized.

The first clutch C1 and the third clutch C3 are operated for the fourth forward speed.

Then, the first ring gear R1 receives an input rotation of an engine, the long pinion LP receives an input rotation of an engine by operation of the third clutch C3, and the first sun gear S1 acts as a fixed element. In this case, according to a cooperative reaction of the first, second, and third planetary gear sets PG1, PG2, and PG3, the fourth speed line is formed and the output element of the third ring gear R3 rotates at a speed 4TH, and the shifting to the fourth forward speed is realized.

The third clutch C3 and the fourth clutch C4 are operated for the fifth forward speed.

Then, the long pinion LP receives an input rotation of an engine by operation of the third clutch C3. In this case, according to cooperative reaction of the first, second, and third planetary gear sets PG1, PG2, and PG3, the fifth speed line is formed and the output element of the third ring gear R3 rotates at a speed 5TH, and the shifting to the fifth forward speed is realized.

The second clutch C2 and the third clutch C3 are operated for the sixth forward speed.

Then, the first ring gear R1 receives an input rotation of an engine, the long pinion LP receives an input rotation of an engine by operation of the third clutch C3, and the first sun gear R1 acts as a fixed element. In this case, according to a cooperative reaction of the first, second, and third planetary gear sets PG1, PG2, and PG3, the sixth speed line is formed and the output element of the third ring gear R3 rotates at a speed 6TH, and the shifting to the sixth forward speed is realized.

The third clutch C3 and the second brake B2 are operated for the seventh forward speed.

Then, the first ring gear R1 receives an input of an engine, the long pinion LP receives an input of an engine rotation by operation of the third clutch C3, and the first sun gear S1, the second planet carrier PC2, and the long sun gear LS act as fixed elements. In this case, according to a cooperative reaction of the first, second, and third planetary gear sets PG1, PG2, and PG3, the seventh speed line is formed and the output element of the third ring gear R3 rotates at a speed 7TH, and the shifting to the seventh forward speed is realized.

The third clutch C3 and the first brake B1 are operated for the eighth forward speed.

Then, the first ring gear R1 and the long pinion LP receive an input of an engine, and the second ring gear R2 acts as a fixed element. In this case, according to a cooperative reaction of the first, second, and third planetary gear sets PG1, PG2, and PG3, the eighth speed line is formed and the output element of the third ring gear R3 rotates at a speed 8TH, and the shifting to the eighth forward speed is realized.

The fourth clutch C4 and the first brake B1 are operated for the reverse speed.

Then, the first ring gear R1 receives an input rotation of an engine, and the second ring gear R2 acts as a fixed element In this case, according to a cooperative reaction of the first, second, and third planetary gear sets PG1, PG2, and PG3, the reverse speed line is formed and the output element of the third ring gear R3 rotates at a speed R, and the shifting to the reverse speed is realized.

The speed line with respect to the planetary gear set, as described above, is obvious to a person of ordinary skill in the art, so a detailed description thereof will be omitted.

As shown in FIG. 1, in the eight-speed automatic transmission according to an exemplary embodiment of the present invention, the first clutch C1 and the third clutch C3 are disposed between the output shaft 40 and the third planetary gear set PG3. Thus, one lubrication line for lubrication and cooling the first clutch C1 and the third clutch C3 can be disposed so that a simplified structure can be achieved.

Figure 4:
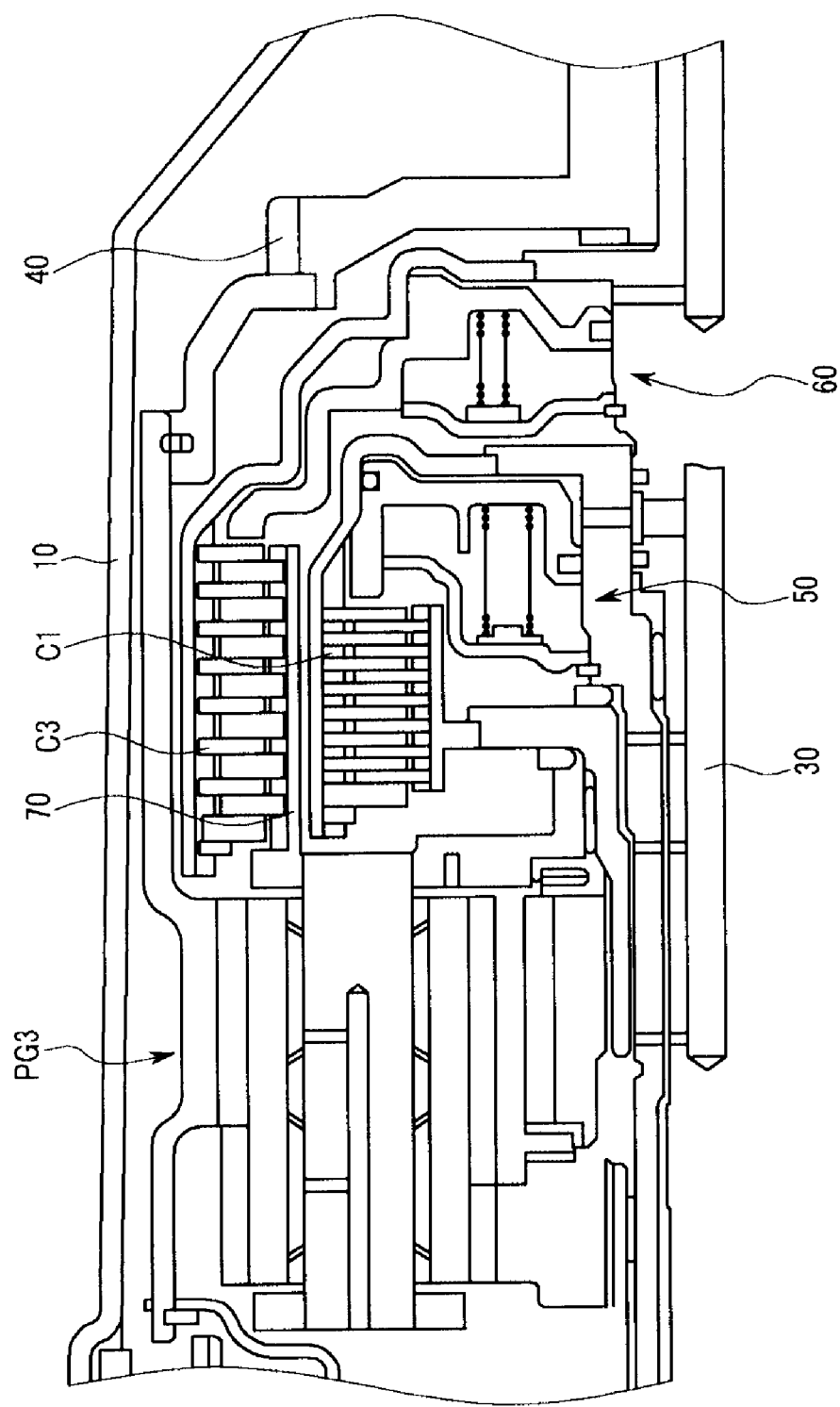
FIG. 4 is a schematic view of the eight-speed automatic transmission for a vehicle according to the exemplary embodiment of the present invention, and shows an arrangement of a first clutch and a third clutch.

FIG. 4 is a schematic view of the eight-speed automatic transmission for a vehicle according to the exemplary embodiment of the present invention, and shows an arrangement of a first clutch and a third clutch.

Referring to FIG. 4, the first clutch C1 is disposed within the third clutch C3 substantially in parallel.

According to the arrangement, the overall structure of the automatic transmission may be compact, so the total volume of the automatic transmission may be reduced. The first clutch C1 and the third clutch C3 may be simultaneously lubricated and cooled with one lubrication line.

Figure 5:
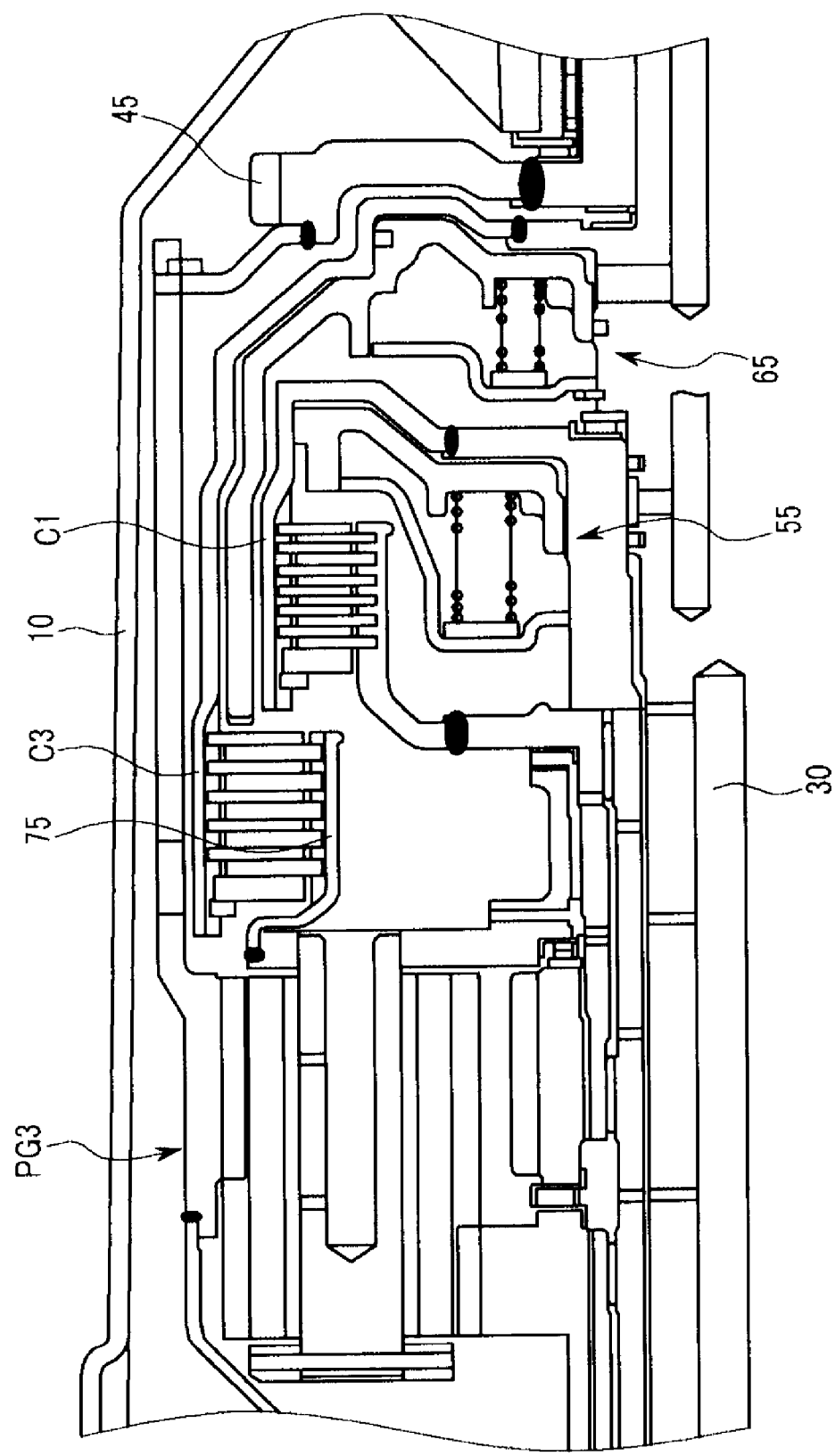
FIG. 5 is a schematic view of the eight-speed automatic transmission for a vehicle according to another exemplary embodiment of the present invention, and shows an arrangement of a first clutch and a third clutch.

FIG. 5 is a schematic view of the eight-speed automatic transmission for a vehicle according to another exemplary embodiment of the present invention that shows an arrangement of a first clutch and a third clutch.

Referring to FIG. 5, the first clutch C1 and the third clutch C3 are disposed substantially in series.

As shown in FIG. 5, diameters or numbers of the friction plates may be reduced, so that design freedom can be obtained, and the overall structure of the automatic transmission may be compact and the total volume of the automatic transmission may be reduced.

In FIG. 4 (and FIG. 5), a first clutch piston chamber 50 (and 55) for operating the first clutch C1 is disposed between the third clutch internal diameter 70 (and 75) and the input shaft 20.

A third clutch piston chamber 60 (and 65) for operating the third clutch C3 is disposed between the first clutch piston chamber 50 (and 55) and the output shaft 40 (and 45).

The second clutch C2 and the fourth clutch C4 are disposed together between the compound planetary gear set PG3 and the double pinion planetary gear set PG2.

Thus, a hydraulic line for supplying hydraulic pressure to the second clutch C2 and the fourth clutch C4 may be easily designed and the overall volume of the automatic transmission may be reduced.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. An eight-speed automatic transmission for a vehicle, comprising a single pinion planetary gear set, a double pinion planetary gear set, a compound planetary gear set, a first clutch, a second clutch, a third clutch, a fourth clutch, a first brake, a second brake, and a one-way clutch, wherein:

an input shaft is disposed for receiving power of an engine;

the single pinion planetary gear set comprises a first ring gear fixedly connected to the input shaft, a first sun gear fixedly connected to a housing, and a first planet carrier;

the double pinion planetary gear set comprises a second ring gear variably fixed to the housing by the first brake or the one-way clutch that are disposed in parallel, a second sun gear fixedly connected to the first planet carrier, and a second planet carrier variably connected to the second ring gear by the second clutch; and the compound planetary gear set comprises a short sun gear variably connected to the second sun gear by the first clutch, a short pinion engaged with the short sun gear, a long sun gear fixedly connected to the second planet carrier, a long pinion engaged with the short pinion and the long sun gear and variably connected to the input shaft by the third clutch, and a third ring gear that is engaged with the long pinion, is variably connected to the second planet carrier and the long sun gear by the fourth clutch, and is connected to an output shaft, wherein the second brake variably fixes the second planet carrier and the long sun gear to the housing, the single pinion planetary gear set, the double pinion planetary gear set, and the compound planetary gear set are disposed in a sequence of the single pinion planetary gear set, the double pinion planetary gear set, and the compound planetary gear set from the engine to the output shaft, and the first clutch and the third clutch are disposed between the compound planetary gear set and the output shaft.

2. The eight-speed automatic transmission for a vehicle of claim 1, wherein the first clutch and the third clutch is disposed substantially in parallel.

3. The eight-speed automatic transmission for a vehicle of claim 1, wherein the first clutch and the third clutch is disposed substantially in series.

4. The eight-speed automatic transmission for a vehicle of claim 1, wherein a first clutch piston chamber for operating the first clutch is disposed between the input shaft and a third clutch internal diameter.

5. The eight-speed automatic transmission for a vehicle of claim 4, wherein a third clutch piston chamber for operating the third clutch is disposed between the first clutch piston chamber and the output shaft.

6. The eight-speed automatic transmission for a vehicle of claim 1, wherein the second clutch and the fourth clutch are disposed between the compound planetary gear set and the double pinion planetary gear set.

* * * * *